(12) United States Patent
Haldeman et al.

(10) Patent No.: US 10,384,771 B2
(45) Date of Patent: *Aug. 20, 2019

(54) GIMBALED TAIL ROTOR HUB WITH SPHERICAL ELASTOMERIC CENTRIFUGAL FORCE BEARING FOR BLADE RETENTION AND PITCH CHANGE ARTICULATION

(71) Applicant: Bell Helicopter Textron Inc., Fort Worth, TX (US)

(72) Inventors: Andrew Haldeman, Fort Worth, TX (US); Frank Bradley Stamps, Colleyville, TX (US); Drew Alan Sutton, Lexington, KY (US); James Donn Hethcock, Colleyville, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,229

(22) Filed: May 19, 2017

(65) Prior Publication Data

US 2017/0259913 A1 Sep. 14, 2017

Related U.S. Application Data

(63) Continuation of application No. 13/800,174, filed on Mar. 13, 2013, now Pat. No. 9,657,582.

(51) Int. Cl.
*B64C 27/35* (2006.01)
*B64C 27/32* (2006.01)
(Continued)

(52) U.S. Cl.
CPC ............. *B64C 27/35* (2013.01); *B64C 27/32* (2013.01); *B64C 27/41* (2013.01); *B64C 27/48* (2013.01);
(Continued)

(58) Field of Classification Search
CPC ......... B64C 27/35; B64C 27/78; B64C 27/32; B64C 27/41; B64C 27/48; B64C 29/0033; B64C 27/52; B64C 27/82; F01D 7/00
See application file for complete search history.

(56) References Cited

U.S. PATENT DOCUMENTS 3,804,552 A * 4/1974 Covington .............. B64C 27/35 416/134 A
4,135,856 A * 1/1979 McGuire ................. B64C 27/35 416/134 A
(Continued)

FOREIGN PATENT DOCUMENTS

DE 3006088 A1 * 8/1981 ............. B64C 27/32
EP 0091969 A1 * 10/1983 ............. B64C 27/32
(Continued)

OTHER PUBLICATIONS

European Patent Office, Extended European Search Report for EP Application No. 13168634.7 dated Sep. 19, 2013, 7 pp.

*Primary Examiner* — Mark A Laurenzi
*Assistant Examiner* — Wesley G Harris
(74) *Attorney, Agent, or Firm* — Edwin S. Flores; Daniel J. Chalker; Chalker Flores, LLP (57) ABSTRACT

A rotor hub comprises a gimbal assembly and an elastomeric centrifugal force bearing. The gimbal assembly is configured to transfer rotational movement of a mast to the rotor hub and to enable the rotor hub to flap relative to the mast. The elastomeric centrifugal force bearing is configured to withstand centrifugal force of a rotor blade when the mast is rotated and is configured to accommodate pitch changes of the rotor blade. A method comprises designing a gimbal assembly that enables a tail rotor hub to flap relative to a tail rotor mast. A centrifugal force bearing is selected that enables tail rotor blades to withstand centrifugal force and that allows for tail rotor blade pitch change articulation. Then, instructions are provided to use the gimbal assembly and the centrifugal force bearing in an in-plane tail rotor assembly.

18 Claims, 10 Drawing Sheets

(51) Int. Cl.
  *B64C 29/00* (2006.01)
  *B64C 27/48* (2006.01)
  *B64C 27/41* (2006.01)
  *B64C 27/52* (2006.01)
  *B64C 27/82* (2006.01)
  *F01D 7/00* (2006.01)
  *B64C 27/78* (2006.01)

(52) U.S. Cl.
  CPC .............. *B64C 27/52* (2013.01); *B64C 27/78* (2013.01); *B64C 27/82* (2013.01); *B64C 29/0033* (2013.01); *F01D 7/00* (2013.01)

(56) References Cited

U.S. PATENT DOCUMENTS

| | | | |
|---|---|---|---|
| 5,145,321 A * | 9/1992 | Flux | B64C 27/35 416/134 A |
| 5,807,202 A | 9/1998 | Sammataro | |
| 6,695,254 B2 | 2/2004 | Zoppitelli et al. | |
| 6,764,280 B2 | 7/2004 | Sehgal et al. | |
| 8,257,051 B2 | 9/2012 | Stamps et al. | |
| 9,657,582 B2 | 5/2017 | Haldeman et al. | |
| 2002/0136636 A1 | 9/2002 | Sehgal et al. | |
| 2003/0178528 A1 | 9/2003 | Zoppitelli et al. | |

FOREIGN PATENT DOCUMENTS

| | | | |
|---|---|---|---|
| EP | 1346910 A1 * | 9/2003 | ............. B64C 27/35 |
| EP | 2778062 A1 | 9/2014 | |

\* cited by examiner

GIMBALED TAIL ROTOR HUB WITH SPHERICAL ELASTOMERIC CENTRIFUGAL FORCE BEARING FOR BLADE RETENTION AND PITCH CHANGE ARTICULATION

CROSS-REFERENCE TO RELATED APPLICATIONS

This application claims priority to and is a continuation patent application of U.S. patent application Ser. No. 13/800,174 filed on Mar. 13, 2013, now U.S. Pat. No. 9,657,582, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Helicopters commonly include a tail rotor assembly. The tail rotor assembly includes two or more blades that are rotated about a central axis of rotation to generate thrust. The thrust can be used to counter the torque effect created by a main rotor assembly and can also be used to allow a pilot to control the yaw of a helicopter. The amount and direction of the thrust is generally controlled by collectively changing the angles of attack of all of the tail rotor blades together.

Tail rotor blades may also be required to accommodate at least some amount of cyclic flapping and feathering to counter the dissymmetry of lift phenomenon that occurs as a helicopter moves through the air. In particular, as a tail rotor blade moves in the same direction as the helicopter movement (e.g., an advancing blade in forward flight), the tail rotor blade experiences a greater air speed, generates more thrust, and flaps in the direction opposite of the thrust. Similarly, as a tail rotor blade moves in the opposite direction as the helicopter movement (e.g., a retreating blade in forward flight), the tail rotor blade experiences a lower air speed, generates less thrust, and flaps in the direction of the thrust. To compensate for the dissymmetry of lift and control the amount of flapping, tail rotor blades can be designed to decrease the angle of attack of a tail rotor blade as it moves in the same direction as the helicopter movement and increase the angle of attack of a tail rotor blade as it moves in the opposite direction as the helicopter movement. The cyclic changing of the angles of attack is commonly referred to as feathering or delta-3and is used to balance the thrust generated by each of the tail rotor blades and limit flapping angles.

SUMMARY

In some embodiments of the disclosure, a rotor hub is provided that comprises a gimbal assembly and an elastomeric centrifugal force bearing. The gimbal assembly is configured to transfer rotational movement of a mast to the rotor hub and to enable the rotor hub to flap relative to the mast. The elastomeric centrifugal force bearing is configured to withstand centrifugal force of a rotor blade when the mast is rotated and is configured to accommodate pitch changes of the rotor blade.

In other embodiments of the disclosure, an apparatus is provided that comprises a gimbal assembly, a plate, a pitch horn/shear restraint, a spherical centrifugal force bearing, and a rotor blade. The plate is attached to the gimbal assembly, and the pitch horn/shear restraint is rotatably connected to the plate. The rotor blade is held in place between the pitch horn/shear restraint and the spherical centrifugal force bearing.

In yet other embodiments of the disclosure, a method is provided that comprises designing a gimbal assembly that enables a tail rotor hub to flap relative to a tail rotor mast. A centrifugal force bearing is selected that enables tail rotor blades to withstand centrifugal force and that allows for tail rotor blade pitch change articulation. Then, instructions are provided to use the gimbal assembly and the centrifugal force bearing in an in-plane tail rotor assembly with more than two blades.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Certain embodiments of the disclosure include a gimbaled tail rotor hub that uses elastomeric centrifugal force (CF) bearings. The combination of the gimbaled tail rotor hub and the elastomeric CF bearings enables tail rotor blades to accommodate the cyclic flapping and feathering requirements of a helicopter. In one particular embodiment, for illustration purposes only and not by limitation, a tail rotor hub includes a gimbal assembly that is attached to a tail rotor mast. The gimbal assembly optionally includes one or more bearings that enable the tail rotor hub to flap relative to the tail rotor mast. Then, tail rotor blades are rotatably attached to the tail rotor hub through elastomeric CF bearings and spherical shear bearings that enable the tail rotor blades to feather. Accordingly, the gimbaled tail rotor hub that uses elastomeric CF bearings allows the tail rotor blades to accommodate the cyclic flapping and feathering requirements of a helicopter. Additionally, the use of a gimbaled tail rotor hub that uses elastomeric CF bearings may be advantageous in that it allows for each of the tail rotor blades to lie in the same plane (e.g., an in-plane configuration and/or a scissoring effect). This can reduce the amount of drag caused by a tail rotor assembly and can also modify the tone of the sound generated during operation to reduce the perceived sound level. This can also reduce or eliminate other problems that are experienced when tail rotor blades lie in different planes (e.g., prevent a tail rotor blade from experiencing a vortex generated by another tail rotor blade in a different plane). Furthermore, at least certain embodiments may provide other advantages such as, but not limited to, reduced maintenance, longer lifetimes, fewer parts, and lighter weights as compared to other tail rotor designs. These and other features and advantages of embodiments of the disclosure are described in greater detail below and shown in the accompanying figures.

Figure 1:
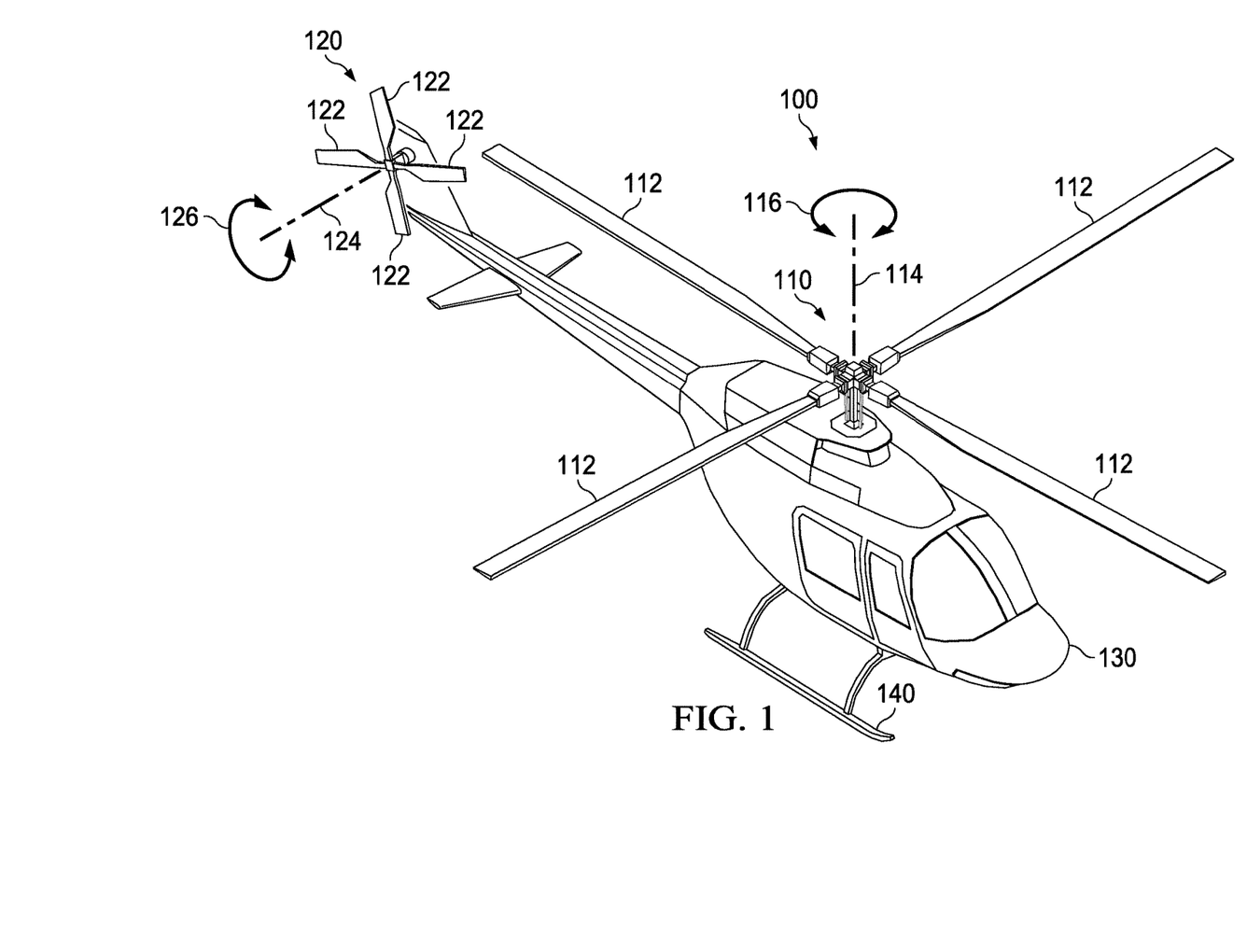
FIG. 1 is a perspective view of a helicopter according to an embodiment of the disclosure.

FIG. 1 is a perspective view of a helicopter 100. Certain embodiments of the disclosure may be used with a helicopter such as helicopter 100. However, it should be understood that the helicopter example is given merely for illustration purposes only. Embodiments of the present disclosure are not limited to any particular setting or application, and embodiments can be used in any setting or application such as other aircraft (e.g., airplanes or tiltrotors), vehicles, or equipment.

Helicopter 100 includes a main rotor assembly 110, a tail rotor assembly 120, a fuselage 130, and landing gear 140. Main rotor assembly 110 includes two or more blades 112 that are rotated about an axis of rotation 114 in either a clockwise direction or a counterclockwise direction as indicated by arrow 116. Main rotor assembly 110 generates a lift force that supports the weight of helicopter 100 and a thrust force that counteracts aerodynamic drag. Main rotor assembly 110 can also be used to induce pitch and roll of helicopter 100.

Tail rotor assembly 120 includes two or more blades 122 that are rotated about an axis of rotation 124 in either a clockwise direction or a counterclockwise direction as indicated by arrow 126. Tail rotor assembly 120 counters the torque effect created by main rotor assembly 110 and allows a pilot to control the yaw of helicopter 100.

Fuselage 130 is the main body section of helicopter 100. Fuselage 130 optionally holds the crew, passengers, and/or cargo and houses the engine, transmission, gear boxes, drive shafts, control systems, etc. that are needed to establish an operable helicopter. Landing gear 140 is attached to fuselage 130 and supports helicopter 100 on the ground and allows it to take off and land.

Figure 2:
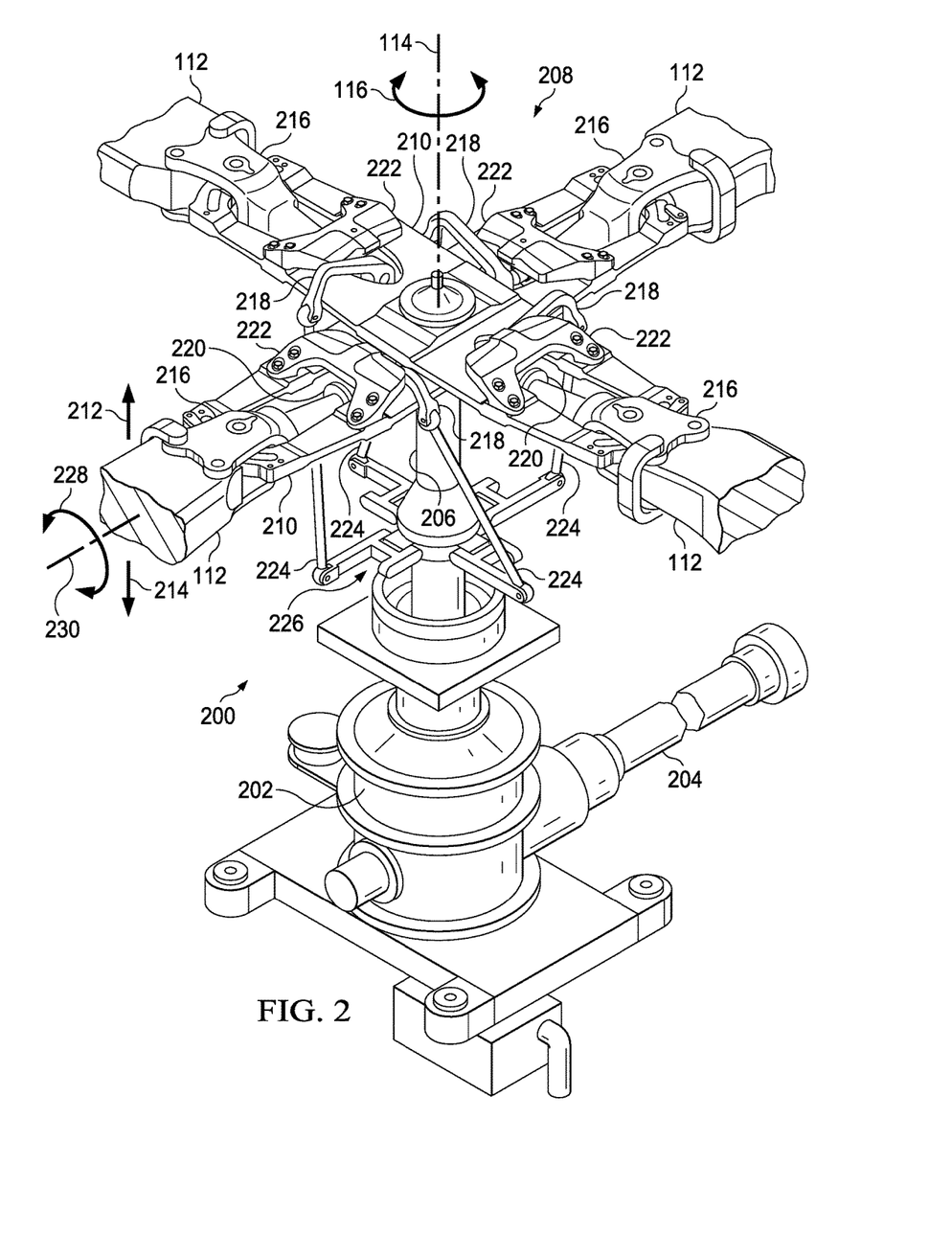
FIG. 2 is a perspective view of a power train according to an embodiment of the disclosure.

FIG. 2 is a perspective view of a power train 200. Power train 200 can be used in a helicopter such as helicopter 100 shown in FIG. 1. However, power train 200 is not limited to any particular setting. Additionally, it should be noted that the particular example shown in FIG. 2 shows a soft-in plane rotor system having four blades 112. Embodiments of the disclosure are not limited to any particular configuration of rotor system and blades, and embodiments may include any type of rotor system (e.g., fully articulated, rigid, semirigid, gimbaled, etc.) and may include any number of blades (e.g., 2, 3, 4, 5, 6, etc.).

Power train 200 includes a transmission 202 that receives power from an engine (not shown) through a driveshaft 204. Transmission 202 drives accessories and controls the rotation 116 of mast 206 about an axis of rotation 114. Mast 206 transfers its rotational movement to blades 112 through a hub 208 that connects mast 206 to blades 112.

Hub 208 optionally includes one or more flexible yokes 210 that enable blades 112 to flap up in the direction indicated by arrow 212 and flap down in the direction indicated by arrow 214. Hub 208 may also include a main rotor grip 216 for each blade 112 that is attached to hub 208. Main rotor grip 216 includes an outboard end that attaches to a blade 112, an inboard end that attaches to a pitch horn 218, and a spindle between the outboard end and the inboard end. The spindle is supported by a shear bearing 220 that holds the spindle in place and allows it to rotate. Shear bearing 220 is in turn held in place by a bridge plate 222 that attaches shear bearing 220 to yoke 210.

Each pitch horn 218 is connected to a pitch linkage 224. Each pitch linkage 224 is driven up and down (e.g., in the directions shown by arrows 212 and 214) by a swashplate assembly 226. Accordingly, as swashplate assembly 226 moves, it drives pitch linkage 224, which drives pitch horn 218 which rotates main rotor grip 216 about shear bearing 220. This allows the pitch of each of the blades 112 to be controlled. For instance, each blade 112 is able to rotate clockwise or counterclockwise as indicated by arrow 228 about an axis of rotation 230 that runs along the length of each blade 112.

Figure 3:
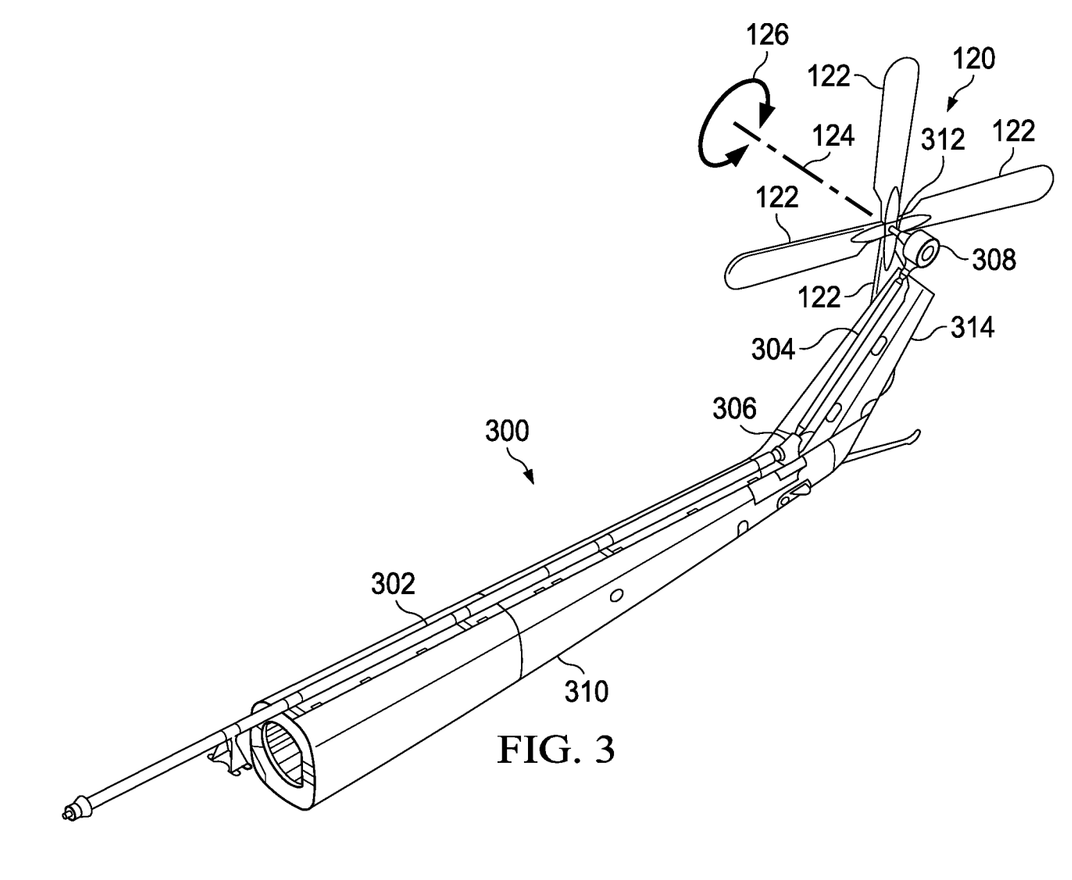
FIG. 3 is a perspective view of a tail rotor drive assembly according to an embodiment of the disclosure.

FIG. 3 is a perspective view of a tail rotor drive assembly 300. Tail rotor drive assembly 300 can be used in a helicopter such as helicopter 100 shown in FIG. 1. However, tail rotor drive assembly 300 is not limited to any particular setting.

Tail rotor drive assembly 300 includes a first driveshaft segment 302, a second driveshaft segment 304, an intermediate gearbox 306, and a tail rotor gearbox 308. The driveshaft segments 302, 304 and gearboxes 306, 308 are optionally housed in a tail boom 310 and a tail 314 that are components of a helicopter fuselage (e.g., fuselage 130 in FIG. 1).

First driveshaft segment 302 is driven by a transmission (e.g., transmission 202 in FIG. 2) and is connected to intermediate gearbox 306. Intermediate gearbox 306 translates rotation from first driveshaft segment 302 to second driveshaft segment 304. Second driveshaft segment 304 is connected to tail rotor gearbox 308 that translates rotation from second driveshaft segment 304 to tail rotor mast 312. For example, tail rotor gearbox 308 can be used to rotate tail rotor mast 312 about an axis of rotation 124 that is at a 90° angle with respect to second driveshaft segment 304. Additionally, one or both of gearboxes 306 and 308 may increase or decrease the speed of the rotation (e.g., increase or decrease the number of revolutions per minute) such that tail rotor blades 122 are rotated either clockwise or counterclockwise at an appropriate speed in the directions indicated by arrow 126.

Figure 4:
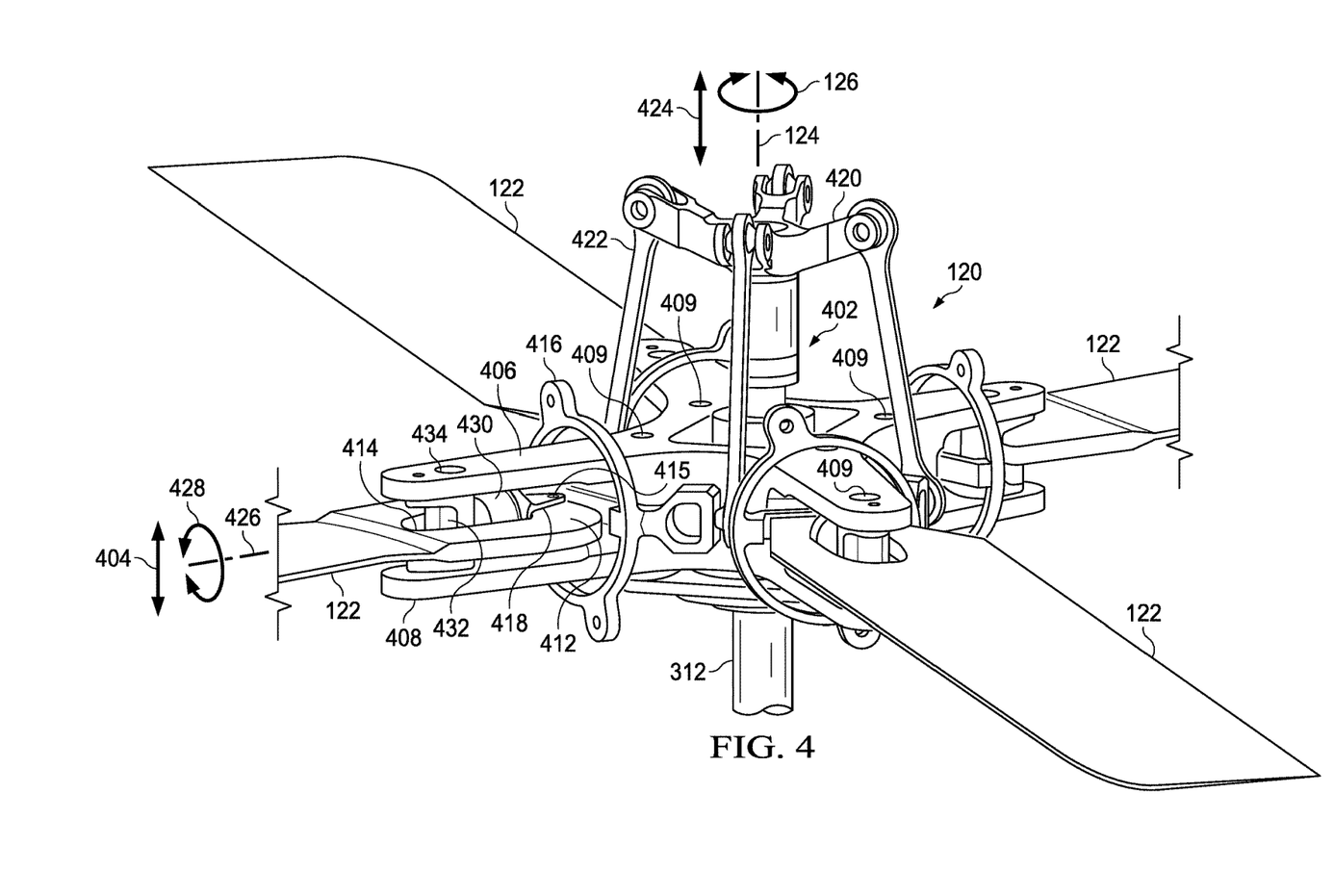
FIG. 4 is a perspective view of a tail rotor assembly having a gimbaled hub and a spherical elastomeric centrifugal force bearing according to an embodiment of the disclosure.

FIG. 4 is a perspective view of a tail rotor assembly 120 having a tail rotor hub 402. As will be described later in greater detail, tail rotor hub 402 optionally includes a gimbal assembly that attaches tail rotor hub 402 to tail rotor mast 312. The gimbal assembly translates rotational movement of tail rotor mast 312 to tail rotor hub 402 such that both tail rotor mast 312 and tail rotor hub 402 rotate about axis of rotation 124 in the directions indicated by arrow 126. Additionally, the gimbal assembly enables tail rotor hub 402 and the attached blades 122 to flap in the directions indicated by arrow 404.

As can be seen in FIG. 4, each of the tail rotor blades 122 lies in a same plane that may be perpendicular or at least about perpendicular to the tail rotor mast axis of rotation 124. This is sometimes referred to as an in-plane configuration. In certain circumstances, an in-plane configuration may be advantageous over other designs (e.g., stacked tail rotors) that have tail rotor blades that lie in different planes. For example, when tail rotor blades lie in different planes, the tail rotors in one plane can generate a vortex that interferes with the operation of blades in a different plane. Also, when tail rotor blades lie in different planes, the amount of drag generated by the tail rotor assembly can be increased as compared to an in-plane configuration that has a smaller frontal profile. Accordingly, the use of an in-plane configuration such as the one shown in FIG. 4 can be advantageous over other designs.

Each tail rotor blade 122 is supported by a CF bearing 430. Each CF bearing is configured to support a blade 122 and withstand centrifugal force that is generated as blade 122 is rotated about tail rotor mast 312. CF bearing 430 is also configured to accommodate blade 122 pitch changes (e.g., blade 122 rotation about axis 426 in the directions indicated by arrow 428). In an embodiment, CF bearing 430 is an elastomeric bearing (e.g., a spherical elastomeric bearing). Spherical elastomeric bearings can be advantageous in that they require less maintenance as compared to other type of bearings (e.g., stainless steel bearings with Teflon/Dacron coatings) that may wear down over time. However, embodiments are not limited to any particular type of bearings and may include other types of bearings.

Tail rotor hub 402 includes an outer plate 406 and an inner plate 408. Each of the plates 406 and 408 may include a number of apertures 409 that can be used to attach the plates 406 and 408 together (e.g., using a through bolt). Additionally, each of the plates 406 and 408 may include multiple arms that extend outward from tail rotor mast 312, and each arm is configured to support one of the tail rotor blades 122. For the sake of simplicity, the components of tail rotor hub 402 will be described with reference to one tail rotor blade 122. However, it should be noted that tail rotor hub 402 may include the same or similar components for each tail rotor blade 122 that is included in a tail rotor assembly 120. Furthermore, it should be noted that although the specific example illustrated in FIG. 4 shows a tail rotor assembly 120 that includes four tail rotor blades 122, embodiments of the disclosure are not limited to any particular number of tail rotor blades 122, and embodiments may be configured to accommodate any number of tail rotor blades 122 (e.g., 2, 3, 4, 5, etc.).

Each tail rotor blade 122 includes an inboard section 412, a first aperture 414, and a second aperture 415. One side of inboard section 412 is connected to a pitch horn/shear restraint 416, and the opposite side of inboard section 412 is connected to a CF bearing clevis fitting 418. CF bearing clevis fitting 418 fits through the first aperture 414 and holds inboard section 412 in place against pitch horn/shear restraint 416. Pitch horn/shear restraint 416 attaches to blade inboard section 412 and transfers feathering motion to blade 122 about axis of rotation 426 in the directions indicated by arrow 428 using pitch linkage 422. In an embodiment, CF bearing clevis fitting 418 may be U-shaped or about U-shaped and supports a top surface, a bottom surface, and an inner side surface of blade 122. CF bearing clevis fitting 418 may also include an aperture or other attachment mechanism that is configured to attach CF bearing clevis fitting 418 to blade 122 through the second aperture 415 (e.g., using a through bolt). However, embodiments are not limited to any particular mechanism for attaching CF bearing clevis fitting 418 to blade 122.

The side of CF bearing clevis fitting 418 opposite the blade inboard section 412 is supported by CF bearing 430. As previously mentioned, CF bearing 430 is configured to support blade 122 and withstand centrifugal force that is generated as blade 122 is rotated about tail rotor mast 312. CF bearing 430 is also configured to enable CF bearing clevis fitting 418 to rotate to accommodate blade 122 pitch changes. CF bearing 430 is optionally held in place and supported by a CF bearing mount 432. As can be seen in FIG. 4, CF bearing 430 and CF bearing mount 432 are configured to fit within aperture 414. CF bearing mount 432 is held in place and supported by outer plate 406 and inner plate 408. In one embodiment, CF bearing mount 432 may be attached to outer plate 406 and inner plate 408 using a through bolt 434. However, embodiments are not limited to any particular attachment mechanism, and CF bearing mount 432 may be attached to hub 402 using other attachment mechanisms.

Pitch horn/shear restraint 416 optionally includes a shaft or spindle that is rotatably mounted within a bearing (e.g., an elastomeric shear bearing or a metal/Teflon bearing) that is held in place and supported by plates 406 and 408. Additionally, pitch horn/shear restraint 416 may also be connected to a pitch change mechanism 420 through a pitch linkage 422. Pitch change mechanism 420 is configured to move away from and towards hub 402 in the directions indicated by arrow 424. Accordingly, pitch change mechanism 420 is configured to control the pitch (e.g., the angle of attack) of each blade 122 by rotating pitch horn/shear restraint 416 about an axis of rotation 426 in the directions indicated by arrow 428. Pitch change mechanism 420 and pitch linkage 422 may also be used to control the pitch of blades 122 during cyclic feathering and flapping. For instance, pitch change mechanism 420 and pitch linkage 422 can decrease or increase the pitch of blade 122 as the thrust generated by the blade and blade flapping increase and can decrease or increase the pitch of blade 122 as the thrust generated by the blade and blade flapping decreases.

Figure 5:
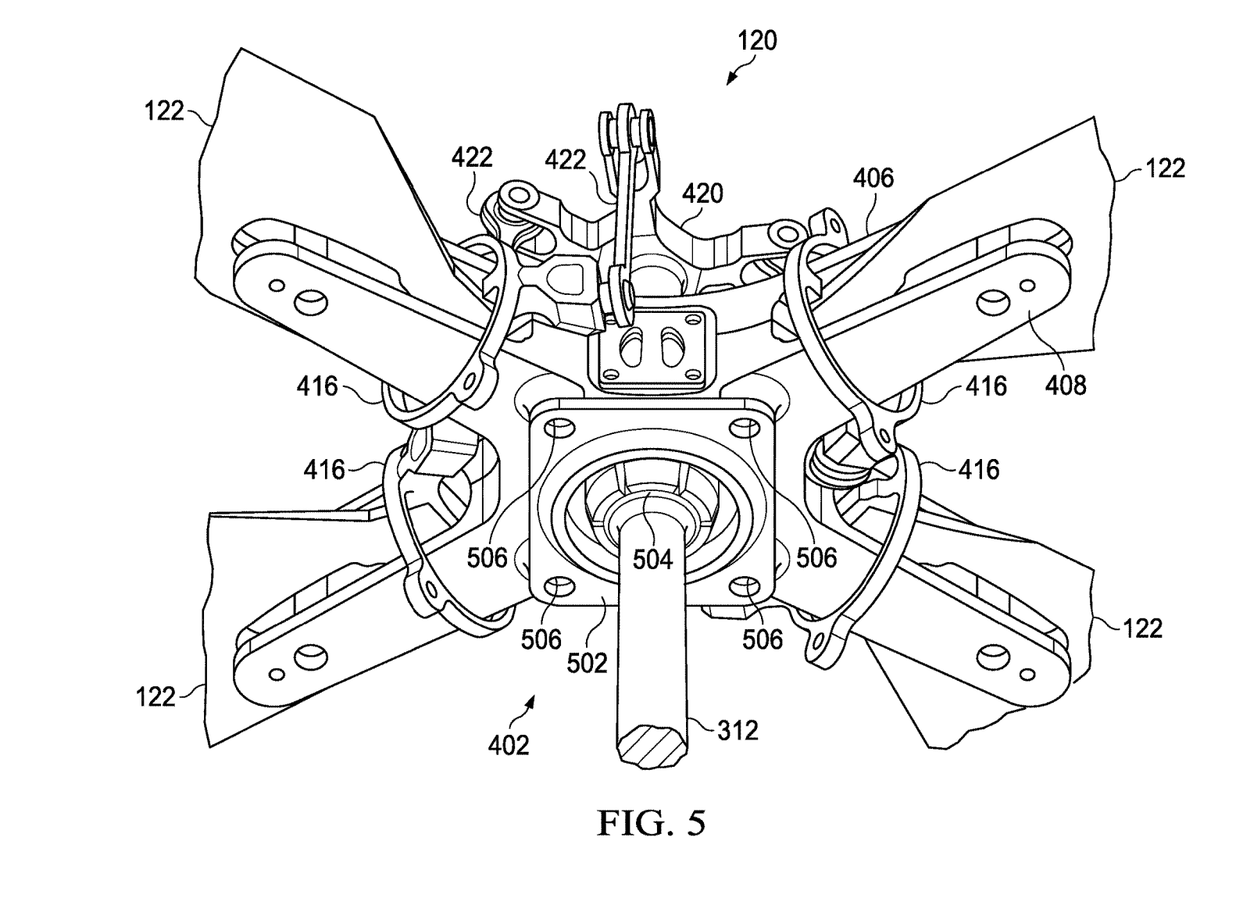
FIG. 5 is a perspective view of the tail rotor assembly of FIG. 4 from the view of a helicopter tail according to an embodiment of the disclosure.

FIG. 5 is a perspective view of tail rotor assembly 120 from the view of a helicopter tail (e.g., tail 314 in FIG. 3). As was described above, tail rotor assembly 120 includes a hub 402 that attaches tail rotor blades 122 to tail rotor mast 312. Hub 402 includes outer plate 406, inner plate 408, and pitch horns/shear restraints 416. Pitch horn/shear restraints 416 are connected to pitch linkages 422 that control the pitches of tail rotor blades 122 using pitch change mechanism 420.

Additionally, FIG. 5 shows that hub 402 may include a flapping stop window 502 and a flapping stop 504. In an embodiment, flapping stop window 502 includes a central aperture that contacts frangible legs on flapping stop 504 to prevent over flapping of hub 402. Flapping stop window 502 may include a number of outer apertures 506 that can be used along with apertures in outer plate 406 and inner plate 408 (e.g., apertures 409 in FIG. 4) to hold the components of hub 402 together. For example, through bolts may be inserted into the apertures and used to attach the components. However, embodiments are not limited to any particular attachment mechanisms.

Figure 6:
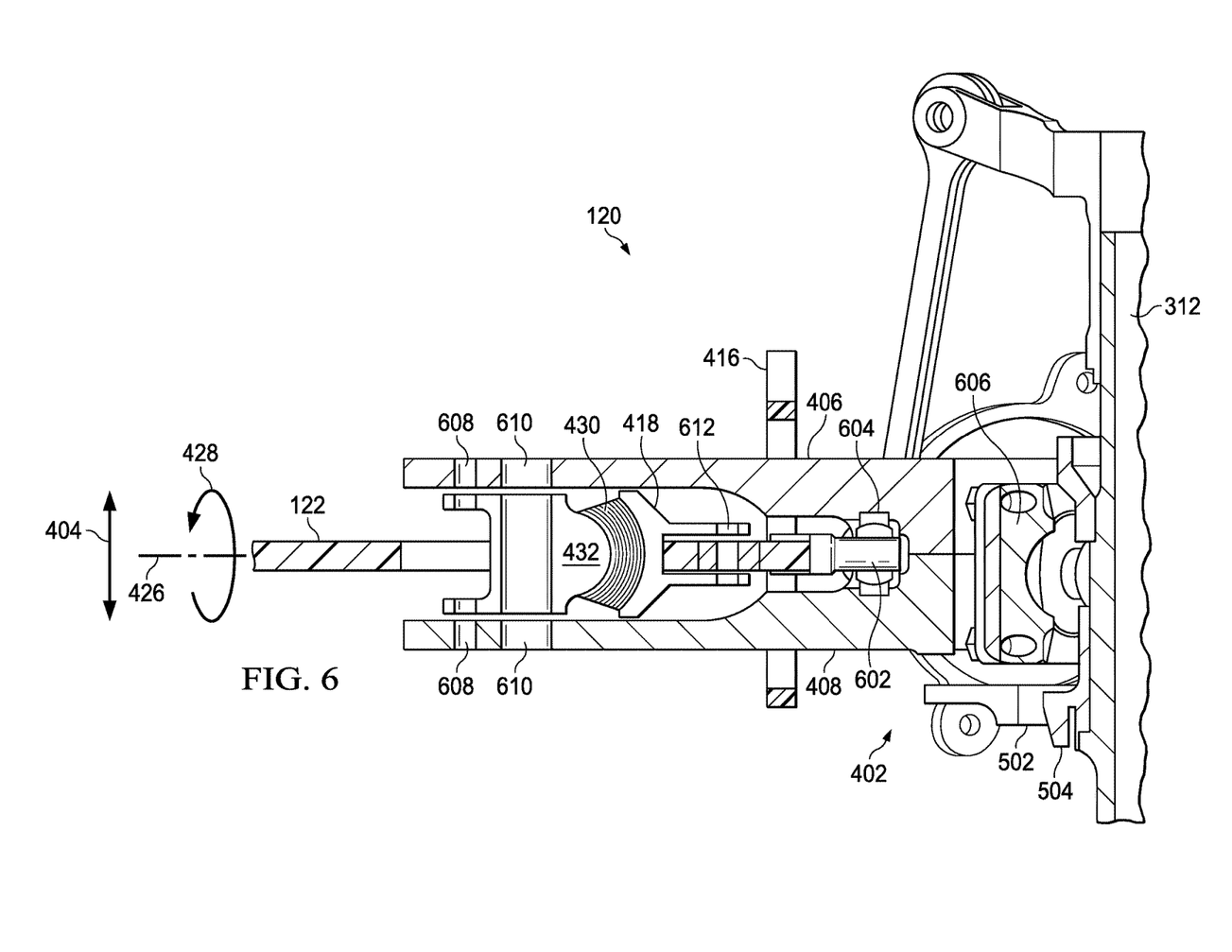
FIG. 6 is a cross-sectional view of the tail rotor assembly of FIGS. 4-5 according to an embodiment of the disclosure.

FIG. 6 is a cross-sectional view of tail rotor assembly 120 from the perspective of a plane that runs through the center of blade 122, hub 402, and tail rotor mast 312. FIG. 6 shows that pitch horn/shear restraint 416 includes a shaft or spindle 602. Spindle 602 fits within a shear restraint bearing 604. Shear restraint bearing 604 is optionally an elastomeric bearing or a metallic bearing that prevents in-plane and out-of-plane movement of spindle 602, but allows spindle 602 (and thus blade 122) to accommodate pitch changes by rotating about an axis of rotation 426 in the directions indicated by arrow 428. Shear restraint bearing 604 is held in place and supported by outer hub plate 406 and inner hub plate 408.

FIG. 6 also shows that hub 402 includes a gimbal assembly 606 that is held in place and supported by outer plate 406, inner plate 408, flapping stop window 502, and flapping stop 504. Gimbal assembly 606 attaches tail rotor hub 402 to tail rotor mast 312 and translates rotational movement of tail rotor mast 312 to tail rotor hub 402. Gimbal assembly also enables tail rotor hub 402 and the attached blades 122 to flap in the directions indicated by arrow 404.

Furthermore, FIG. 6 shows that outer plate 406, inner plate 408, and CF bearing mount 432 may include a first set of apertures 608 and a second set of apertures 610 that can be used to connect outer plate 406, inner plate 408, and CF bearing mount 432 together. Similarly, CF bearing clevis fitting 418 and blade 122 may also include a set of apertures 612 that can be used to connect CF bearing clevis fitting 418 and blade 122 together. In one embodiment, the sets of apertures 608, 610, and 612 are used with a through bolt to attach the components together. Embodiments are not however limited to any particular attachments mechanisms and can be attached together using any attachment mechanisms.

Figure 7:
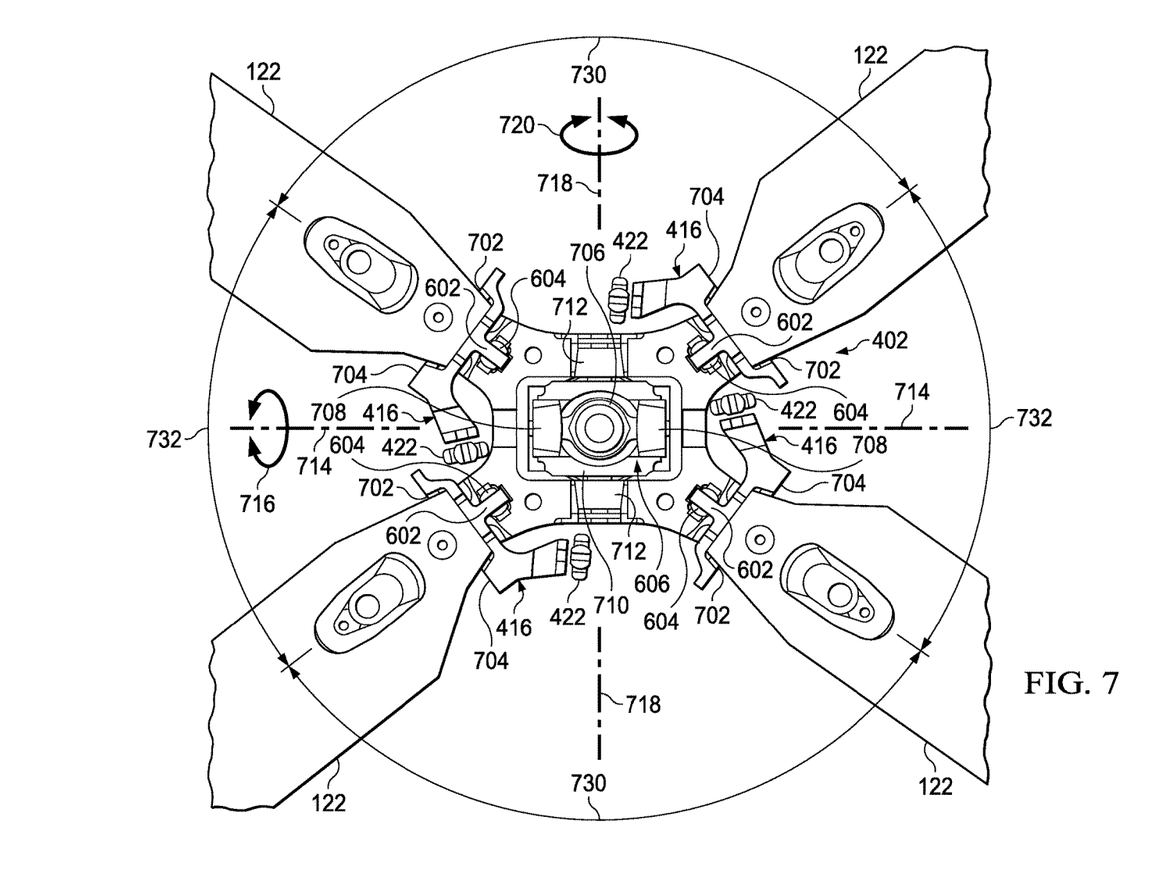
FIG. 7 is a cross-sectional view of the tail rotor assembly of FIGS. 4-6 to show internal components of the hub gimbal assembly according to an embodiment of the disclosure.

FIG. 7 is a cross-sectional view of tail rotor hub 402 and blades 122 from the view of a helicopter tail (e.g., tail 312 in FIG. 3) with inner plate 408 and flapping stop window 502 from FIGS. 5-6 removed. FIG. 7 shows that each pitch horn/shear restraint 416 includes a blade attachment portion 702, a pitch arm portion 704, and spindle 602. Blade attachment portion 702 is configured to support an inboard end of a blade 122, and pitch arm portion 704 is configured to translate motion from pitch linkage 422 to rotational movement of spindle 602 within shear restraint bearing 604.

As can be seen in FIG. 7, gimbal assembly 606 optionally includes a trunnion 706, a first set of elastomeric bearings 708 that fit around opposing trunnion protrusions, a gimbal body 710 that is supported by the first set of elastomeric bearings 708, and a second set of elastomeric bearings 712 that fit around opposing protrusions on the gimbal body 710.

In an embodiment, trunnion 706 has a central aperture that is configured to attach to a tail rotor mast and that is configured to translate rotational movement from the mast to the rest of the tail rotor hub assembly 402 and blades 122. The first set of elastomeric bearings 708 that are attached to trunnion 706 support gimbal body 710 and enable gimbal body 710 to rotate about an axis of rotation 714 in the directions indicated by arrow 716. The second set of elastomeric bearings 712 that are attached to gimbal body 710 support hub plates 406, 408 (shown and labeled in FIGS. 4-6) and enable hub plates 406, 408 (as well as the rest of the hub 402 and blades 122) to rotate about an axis of rotation 718 in the directions indicated by arrow 720. Accordingly, gimbal assembly 606 enables hub 402 and any attached blades 122 to flap relative to a tail rotor mast by enabling hub 402 to rotate about axes 714 and 718.

Furthermore, FIG. 7 shows that blades 122 may be oriented in a scissor configuration. In particular, angles 730 between the centers of two blades may be greater than 90°, and angles 732 between the centers of the other two blades may be less than 90°. Embodiments are not limited to any particular configuration and angles 730 and 732 may both be 90°, about 90°, or any other angles.

Figure 8:
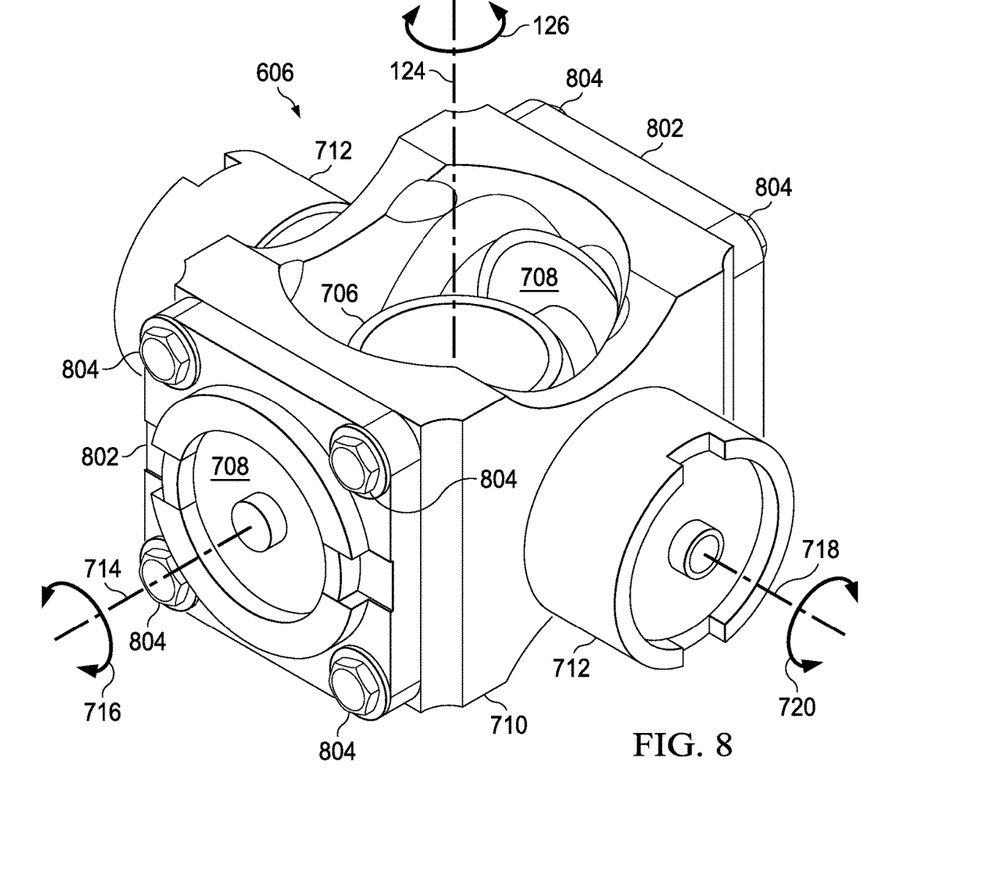
FIG. 8 is a perspective view of a gimbal assembly according to an embodiment of the disclosure.

FIG. 8 is a perspective view of gimbal assembly 606, and FIGS. 9-12 are perspective views of components of gimbal assembly 606. It should be noted that the specific example of a gimbal assembly 606 and its components shown in FIGS. 8-12 are given merely for illustration purposes only. Embodiments of the present disclosure are not limited to any specific gimbal assembly and may include gimbal assemblies and components that differ from the specific examples shown in FIGS. 8-12.

FIG. 8 shows that gimbal assembly 606 includes a trunnion 706, a first set of elastomeric bearings 708 that fit around opposing protrusions of trunnion 706, a gimbal body 710 that fits around trunnion 706 and is supported by the first set of elastomeric bearings 708, a set of bearing caps 802 that are attached to gimbal body 710 and that hold the first set of elastomeric bearings 708 in place, and a second set of elastomeric bearings 712 that fit around protrusions of gimbal body 710 and that are configured to support a tail rotor hub. Gimbal assembly 606 may further have a number of bolts 804 or other attachment mechanisms that can be used to attach bearing caps 802 to gimbal body 710.

As previously mentioned, trunnion 706 is configured to attach to a tail rotor mast and is configured to translate rotation from the tail rotor mast to the rest of the tail rotor hub and any attached blades about an axis of rotation 124 in the directions indicated by arrow 126. The first set of elastomeric bearings 708 are configured to support gimbal body 710 and enable gimbal body 710 (and any other components attached to gimbal body 710 such as a tail rotor hub and tail rotor blades) to rotate about an axis of rotation 714 in the directions indicated by arrows 716, and the second set of elastomeric bearings 712 are configured to support a tail rotor hub and any attached components (e.g., blades, etc.) to rotate about an axis of rotation 718 in the directions indicated by arrow 720. Therefore, gimbal assembly 606 enables a tail rotor hub to be attached to a tail rotor mast and to be able to flap relative to the tail rotor mast in any direction.

Figure 9:
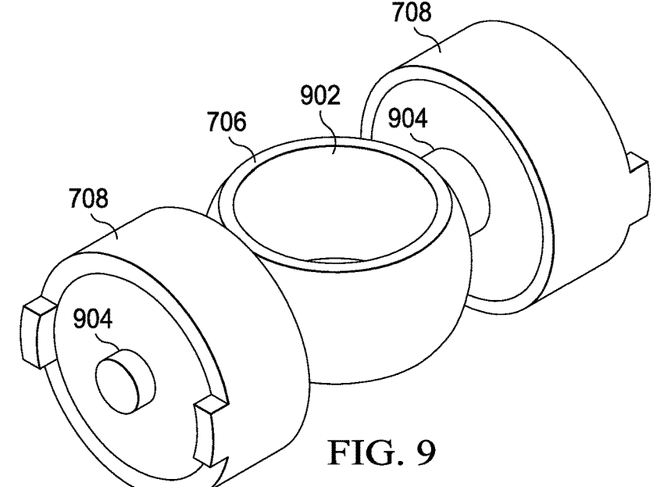
FIG. 9 is a perspective view of a gimbal assembly trunnion with a mast attachment feature and a first set of radial elastomeric bearings according to an embodiment of the disclosure.

FIG. 9 is a perspective view of a gimbal assembly trunnion 706 and first set of elastomeric bearings 708. Trunnion 706 includes a central aperture 902 that is configured to attach to and translate rotation from a tail rotor mast, and a set of opposing protrusions 904 that enable the first set of elastomeric bearings 708 to be attached to trunnion 706.

Figure 10:
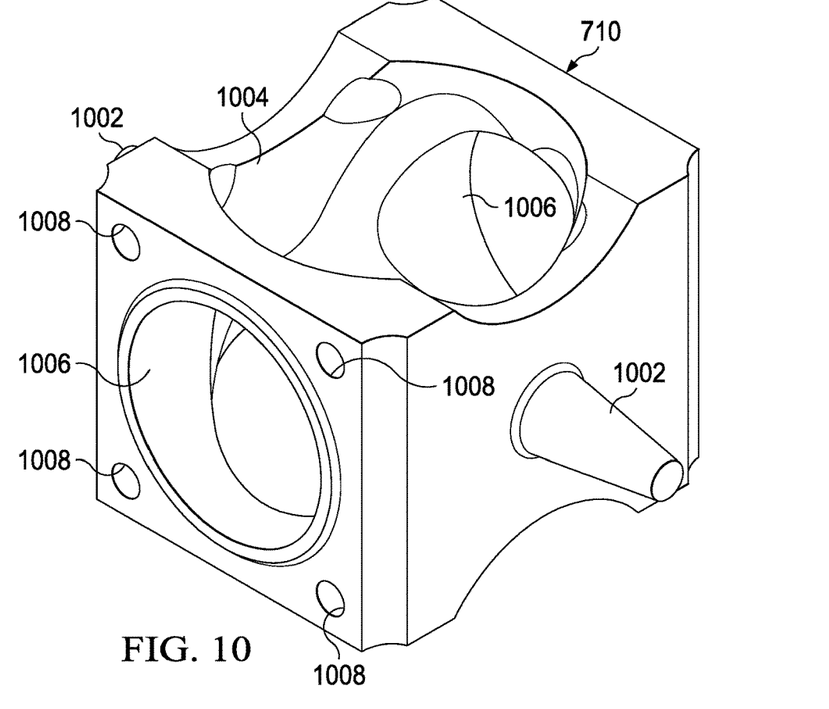
FIG. 10 is a perspective view of a gimbal assembly body according to an embodiment of the disclosure.

FIG. 10 is a perspective view of gimbal body 710. Gimbal body 710 includes a set of opposing protrusions 1002 that are configured to support the second set of elastomeric bearings 712 (shown and labeled in FIG. 8). Gimbal body 710 also includes a center opening or aperture 1004 that is configured to house the trunnion 706 (shown and labeled in FIG. 8) and opposing side apertures 1006 configured to accommodate the first set of elastomeric bearings 708 (shown and labeled in FIG. 8). Gimbal body 710 may further have a number of other apertures 1008 or other attachment mechanisms that can be used to attach bearing caps 802 (shown and labeled in FIG. 8) to gimbal body 710.

Figure 11:
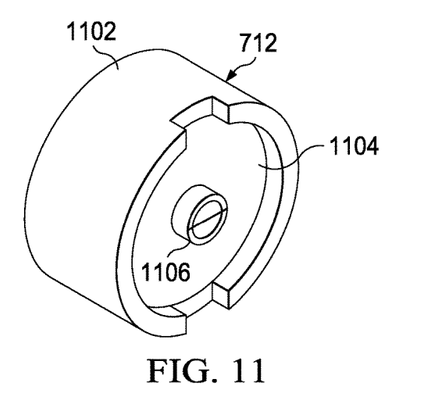
FIG. 11 is a perspective view of a radial elastomeric bearing according to an embodiment of the disclosure.

FIG. 11 is a perspective view of an elastomeric bearing 712. Each bearing in the second set of elastomeric bearings 712 and the first set of elastomeric bearings 708 (shown and labeled in FIGS. 7-9) may be the same or about the same. However, in other embodiments, the elastomeric bearings may be configured differently from each other.

Elastomeric bearing 712 includes an outer casing 1102, an inner casing 1104, and an elastomeric bearing portion 1106. Outer casing 1102 is configured to support a tail rotor hub (e.g., tail rotor hub plates 406 and 408 in FIGS. 4-6), and inner casing 1104 is configured to fit around and be supported by a gimbal body protrusion 1002 (shown and labeled in FIG. 10). Outer casing 1102 and inner casing 1104 are optionally made from a rigid material such as a metal (e.g., steel), and elastomeric bearing portion 1106 is optionally made from a flexible/elastomeric material (e.g., rubber). In one embodiment, outer casing 1102, inner casing 1104, and bearing portion 1106 may have tapered shapes. In another embodiment, outer casing 1102, inner casing 1104, and bearing portion 1106 may have annular cylinder shapes. However, embodiments are not limited to any particular materials or shapes and can include other materials and shapes.

Figure 12:
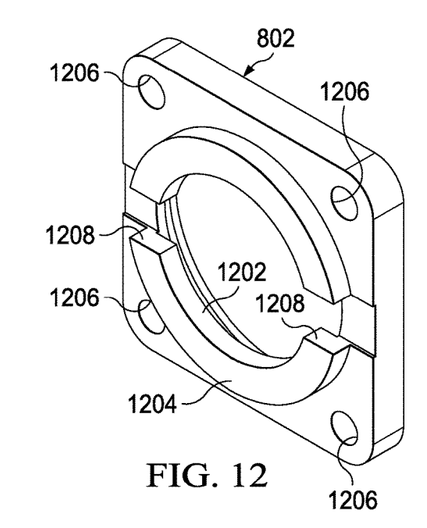
FIG. 12 is a perspective view of a gimbal assembly bearing cap according to an embodiment of the disclosure.

FIG. 12 is a perspective view of a bearing cap 802. Bearing cap 802 includes a central aperture 1202 that is configured to accommodate a bearing (e.g., bearing 712 in FIG. 11), a lip portion 1204 configured to hold the bearing in place between the lip portion 1204 and a gimbal assembly body (e.g., body 710 in FIGS. 8 and 10), and outer apertures 1206 or other attachment mechanisms that are configured to attach bearing cap 802 to a gimbal assembly body (e.g., using gimbal body apertures 1008 in FIG. 10). Bearing cap 802 may also include features 1208 that interface with a bearing outer casing (e.g., casing 1102 in FIG. 11) and force rotation about axes 714/718 (shown and labeled in FIGS. 7-8).

Figure 13:
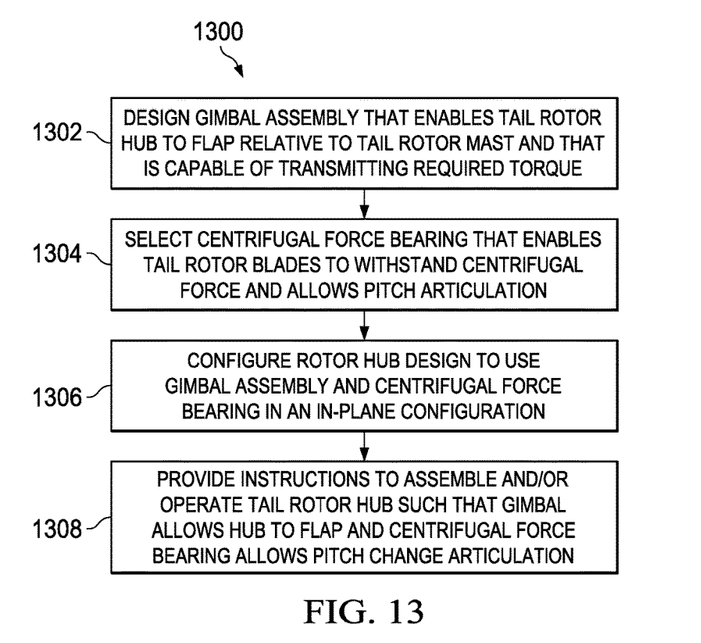
FIG. 13 is a flowchart illustrating a method of designing a gimbaled tail rotor hub with elastomeric centrifugal force bearings according to an embodiment of the disclosure.

FIG. 13 is a flowchart illustrating a method 1300 of designing a gimbaled tail rotor hub with elastomeric CF bearings. At block 1302, a gimbal assembly is designed that enables a tail rotor hub to flap relative to a tail rotor mast and that is capable of transmitting required torque. For instance, a gimbal assembly may be designed that uses a trunnion that attaches to a tail rotor mast and one or more elastomeric bearings that enable a hub to flap. At block 1304, a CF bearing is selected that enables the tail rotor blades to withstand CF and allows for tail rotor blade pitch change articulation. The selected CF bearing may be for example a spherical elastomeric bearing. At block 1306, a rotor hub design is configured to use the gimbal assembly from block 1302 and the CF bearing from block 1304 in an in-plane configuration (e.g., each of the tail rotor blades lies in a same or about a same plane that is optionally perpendicular or about perpendicular to the tail rotor mast). At block 1308, instructions are provided to assemble and operate the tail rotor hub such that the gimbal assembly from block 1302 allows the tail rotor hub to flap and the CF bearing from block 1304 allows for tail rotor blade pitch change articulation. Furthermore, other embodiments of a method may include additional steps such as, but not limited to, manufacturing, assembling, and operating any one or more of the components described herein.

As has been described above and shown in the figures, certain embodiments of the disclosure include a gimbaled tail rotor hub that uses elastomeric CF bearings. The combination of the gimbaled tail rotor hub and the elastomeric CF bearings enables tail rotor blades to accommodate the cyclic flapping and feathering requirements of a helicopter and allows for each of the tail rotor blades to lie in the same plane (e.g., an in-plane configuration). Furthermore, at least certain embodiments may provide other advantages such as, but not limited to, reduced maintenance, longer lifetimes, fewer parts, and lighter weights as compared to other tail rotor designs. For example, other tail rotor hub designs may use steel spherical bearings, fully articulated tail rotor blades, and/or stacked tail rotor blades. These other designs may require more maintenance, have shorter lifetimes, require more and/or heavier components, require out-of-plane configurations, and generate more drag. Additionally, some embodiments may also improve performance of a tail rotor assembly and improve noise characteristics. For example, some embodiments may decrease a perceived sound level by changing the tone of the sound generated during operation. Accordingly, the gimbaled tail rotor hub with elastomeric CF bearing according to embodiments of the disclosure may be advantageous in at least certain circumstances.

Finally, it should be noted that at least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A rotor hub for a helicopter comprising a rotor hub and rotor blades comprising:
   a gimbal assembly that is configured to transfer rotational movement of a mast to the rotor hub and that is configured to enable the rotor hub to flap relative to the mast;
   a plate attached to the gimbal assembly;
   a pitch/horn shear restraint comprising a rotatable connection to the plate; and
   a spherical elastomeric centrifugal force bearing that is configured to withstand centrifugal force of a rotor blade when the mast is rotated and that is configured to accommodate pitch changes of the rotor blade, wherein the rotor blade is positioned between the rotatable connection of the pitch horn/shear restraint and the spherical elastomeric centrifugal force bearing.

2. The rotor hub of claim 1, further comprising a plurality of pitch horns/shear restraints that are configured in an in-plane configuration.

3. The rotor hub of claim 1, wherein the spherical elastomeric centrifugal force bearing is configured to fit within an aperture of the rotor blade.

4. The rotor hub of claim 1, wherein the gimbal assembly comprises one or more elastomeric bearings.

5. The rotor hub of claim 1, wherein the gimbal assembly comprises a trunnion.

6. A rotor hub for a helicopter comprising a rotor hub and rotor blades comprising:
   a gimbal assembly that transfers rotational movement of a mast to the rotor hub that comprises at least one pair of opposing sets of elastomeric bearings and that is configured to enable the rotor hub to flap relative to the mast;
   a plate attached to the gimbal assembly;
   a pitch horn/shear restraint comprising a rotatable connection to the plate; and
   a centrifugal force bearing attached to the plate,
   wherein the rotor blades are positioned between the rotatable connection of the pitch horn/shear restraint and the centrifugal force bearing.

7. The rotor hub of claim 6, further comprising additional rotor blades, and wherein the rotor blade and the additional rotor blades are configured in an in-plane configuration.

8. The rotor hub of claim 7, wherein the rotor blade and the additional rotor blades comprise a scissor configuration.

9. The rotor hub of claim 6, wherein the gimbal assembly comprises a trunnion and one or more elastomeric bearings.

10. The rotor hub of claim 9, wherein the one or more elastomeric bearings comprises two sets of opposing elastomeric bearings.

11. The rotor hub of claim 6, wherein the pitch horn/shear restraint is rotatably connected to the plate through an elastomeric bearing and an elastomeric or metallic shear bearing.

12. The rotor hub of claim 6, wherein the rotor blade comprises an aperture, and wherein the centrifugal force bearing is positioned within the rotor blade aperture.

13. The rotor hub of claim 6, wherein the elastomeric bearing is attached to the plate through a centrifugal force bearing clevis fitting.

14. The rotor hub of claim 6, wherein the pitch horn/shear restraint is configured to control a pitch of the rotor blade using a pitch linkage and accommodate in-plane shear loads.

15. The rotor hub of claim 6, wherein the gimbal assembly, the plate, the pitch horn/shear restraint, the centrifugal force bearing, and the rotor blade are components of a tail rotor assembly, wherein the apparatus further comprises an engine, a transmission, a drive shaft, a mast, and a fuselage, wherein power from the engine is transferred to the tail rotor assembly through the transmission, the drive shaft, and the mast, and wherein the fuselage houses and supports at least a portion of the engine, the drive shaft, and the transmission.

16. A method comprising:
   providing a gimbal assembly that enables a rotor hub to flap relative to a rotor mast;
   connecting a spherical centrifugal force bearing that enables rotor blades to withstand centrifugal force and allows for rotor blade pitch change articulation, wherein at least a pair of opposing rotor blades are positioned between a rotatable connection of a pitch horn/shear restraint and the spherical centrifugal force bearing.

17. The method of claim 16, wherein the gimbal assembly comprises a trunnion and two or more opposing elastomeric bearings.

18. The method of claim 16, wherein the gimbal assembly and the spherical centrifugal force bearing feathers the rotor blade relative to the tail rotor hub.

* * * * *